United States Patent [19]
Friot et al.

[11] Patent Number: 5,557,555
[45] Date of Patent: Sep. 17, 1996

[54] CIRCUIT FOR REGULATING THE AIR CONDITIONING OF PREMISES

[75] Inventors: Laurent Friot, Poitiers; Jean-Claude Trigeassou, Mignaloux-Beauvoir, both of France

[73] Assignee: GEC Alsthom Transport SA, Paris, France

[21] Appl. No.: 200,666

[22] Filed: Feb. 23, 1994

[30] Foreign Application Priority Data

Feb. 24, 1993 [FR] France ................................. 93 02111
Sep. 9, 1993 [FR] France ................................. 93 10730

[51] Int. Cl.⁶ .................................................. G05B 13/04
[52] U.S. Cl. ........................... 364/578; 364/150; 62/132; 236/1 B; 236/91 D
[58] Field of Search ...................... 364/149, 150, 364/151, 557, 578; 62/132, 178, 180; 236/46 R, 1 B, 1 C, 91 R, 91 D, 91 F

[56] References Cited

U.S. PATENT DOCUMENTS

| | | | |
|---|---|---|---|
| 4,341,345 | 7/1982 | Hammer et al. | 236/46 R |
| 4,696,167 | 9/1987 | Matsui et al. | 364/151 X |
| 4,744,511 | 5/1988 | Kakehi et al. | 364/151 X |
| 4,784,212 | 11/1988 | Brimer et al. | 364/578 X |
| 4,897,798 | 1/1990 | Cler | 364/505 |

*Primary Examiner*—Collin W. Park
*Attorney, Agent, or Firm*—Sughrue, Mion, Zinn, Macpeak & Seas

[57] ABSTRACT

A circuit for regulating the air conditioning of premises that are stationary or mobile, the premises being air conditioned by means of a conditioning unit controlled by a corrector that receives on its inputs both a reference temperature magnitude and a magnitude representative of the temperature of the premises, the circuit including a member for non-linear and non-stationary simulation of the assembly constituted by the conditioning unit and by the premises, and wherein the corrector comprises means for handling saturation in such a manner as to take account of amplitude limitation in the signal for controlling the process and the model of the process. The invention is particularly applicable to regulating the air conditioning of rail vehicles.

13 Claims, 4 Drawing Sheets

CIRCUIT FOR REGULATING THE AIR CONDITIONING OF PREMISES

The present invention relates to a circuit for regulating the air conditioning of premises that are stationary or mobile, the premises being air conditioned by means of an air conditioning unit.

BACKGROUND OF THE INVENTION

Air conditioning must be regulated in a manner that makes it possible to servo-control the temperature inside the premises to a reference temperature. The regulation must also ensure that initial stages during which air conditioning is being established take place quickly. Thus, the regulation of air conditioning in rail cars must enable air conditioning to be brought into operation quickly and then ensure a constant temperature for passenger comfort.

Air conditioning is often regulated by means of proportional-integral-differential (PID) action systems which do not give full satisfaction, particularly in railway applications. When there is a large difference between the reference temperature and the outside temperature, PID type regulation gives rise to too long a delay in reaching steady conditions and expends too much energy. Generally, when the system is switched on, either the reference value is overshot by a wide margin, thereby giving rise to a pointless loss of energy and to a temperature stabilization time that is too long, or else there is no overshoot, but the waiting time before reaching the reference temperature is much too long.

In practice, the coefficients of the PID system are adjusted manually prior to installing the system in a vehicle, in the hope of achieving the best compromise between the phenomenon of integral action becoming saturated and the difficulty of adjusting differential action.

Regulation of air conditioning based on a PID type system does not perform the function of bringing the air conditioning into operation quickly without overshoot in spite of numerous design tricks being used (desaturation of integral action, change of regulator coefficients in operation) which merely lead to a structure that is complicated and difficult to develop. This problem is particularly difficult for premises where mean operation of the air conditioning assembly is related to the non-linearity of the system (large differences in the dynamic behavior between stages during which temperature is rising and stages during which temperature is falling). Such non-linearity cannot be taken into account by a PID regulator.

OBJECTS AND SUMMARY OF THE INVENTION

The present invention enables the above drawbacks to be remedied by implementing regulation that takes better account of the way in which the system operates. It is implemented by using regulation of the type in which control is based on an internal model that makes it possible to allow knowledge about the process under control to intervene directly. The system makes it possible firstly to use a computer to simulate the operation of the air conditioning system, and secondly to develop a regulator structure and to calculate the parameters therefor.

The invention therefore provides a circuit for regulating the air conditioning of premises that are stationary or mobile, the premises being air conditioned by means of a conditioning unit controlled by a corrector that receives on its inputs, both a reference temperature magnitude and a magnitude representative of the temperature of the premises, the circuit including a member for non-linear and non-stationary simulation of the assembly constituted by the conditioning unit and by the premises.

The simulation member advantageously comprises means for adapting automatically to stages during which the temperature of the premises is rising or falling.

The simulation member has a static gain parameter G and a time constant parameter $\tau$, automatic adaptation thereof being obtained by associating said parameters so that they vary in a manner that is inversely proportional to the difference $\Delta$ between the excitation e of the simulation member and its response s so as to satisfy the differential equation:

$$G \cdot e = s + \tau \frac{ds}{dt}$$

in which:

$G = 1/(a+b\Delta)$ $\tau = 1/(c+d\Delta)$ $\Delta = |s-e|$ where a, b, c and d are coefficients determined during identification of the system.

The simulation member may include a model of the conditioning unit and a model of the premises.

The conditioning unit sucks in new air which is conditioned and blown into the premises, which premises has an outlet for exhausting air to the outside and an outlet for recycling air via said conditioning unit:

the corrector, which also receives a magnitude representative of the temperature of the new air, delivers control signals in parallel both to the conditioning unit and to the model thereof;

the model of the conditioning unit delivers a signal representing the estimated temperature of the blown air;

the model of the premises delivers a signal representative of the temperature of the recycled air estimated on the basis of the measured temperature of the blown air;

a first comparator receives on one of its two inputs said signal representative of the estimated temperature of the recycled air and on its second input a signal representative of the temperature of the air recycled from the premises, said first comparator delivering an output signal constituting the difference between the signals received on its inputs; and the model of the conditioning unit also receives said signal representative of the temperature of the recycled air.

A second comparator may receive on a first input the signal representative of the estimated temperature of the blown air, and on a second input a signal representative of the temperature of the air blown into the premises, and delivers to the corrector a signal representative of the difference between its input signals.

The corrector may include a third comparator receiving on its inputs both the reference temperature magnitude and the magnitude representative of the difference between the temperature of the premises and the estimated temperature thereof, and which delivers an output signal to a first calculation member which delivers an output signal to one of the inputs of a comparator, the comparator receiving on its second input the signal delivered by the second comparator and delivering a signal to a second calculator member which delivers said control signals.

Another object of the present invention is to guarantee a predetermined level of performance even in the event of mismatch between the real system to be air conditioned, and the experimental system that was used for developing the circuit for regulating air conditioning.

The invention therefore also provides a circuit for regulating air conditioning comprising means for handling saturation in such a manner as to take account of amplitude limiting in the signal for controlling both the process and the model of the process.

BRIEF DESCRIPTION OF THE DRAWINGS

The invention will be better understood and other advantages and features will appear on reading the following description given by way of non-limiting example and accompanied by the accompanying drawings, in which.

MORE DETAILED DESCRIPTION

By way of example, the invention relates to regulating air conditioning in a rail vehicle. Nevertheless, the invention is applicable without any particular difficulty for the person skilled in the art to any other type of premises whether stationary or mobile.

Figure 1:
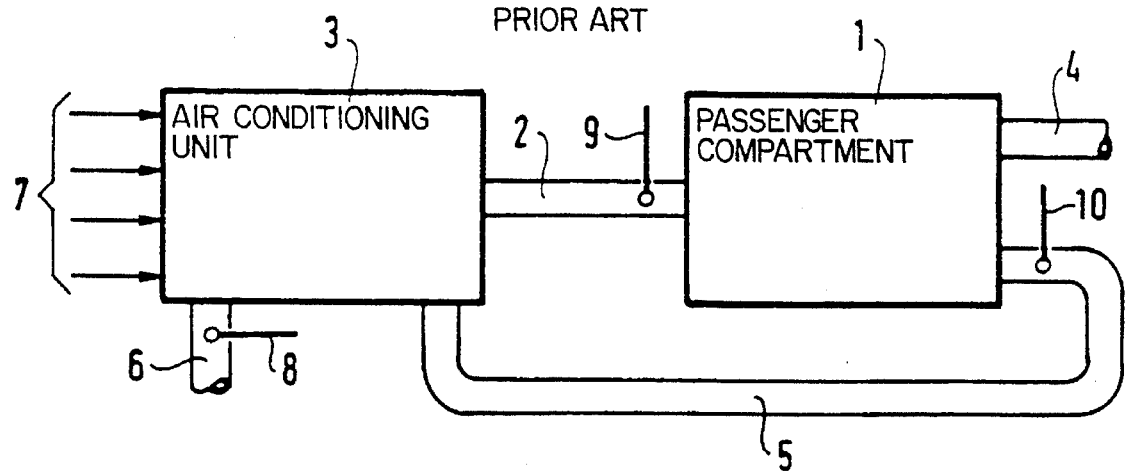
FIG. 1 shows the structure of a prior art railway air conditioning system.

The conventional structure of a railway air conditioning system is shown diagrammatically in FIG. 1. Via a duct 2 the passenger compartment 1 of a rail vehicle receives air that is blown in from the air conditioning unit 3. It possesses a duct 4 enabling used air to be exhausted to the outside and a duct 5 connecting the passenger compartment to the air conditioning unit. This duct 5 enables a fraction of the air to be recycled which would otherwise have been exhausted to the outside from the passenger compartment, which fraction is mixed with new air entering the conditioning unit 3 via a duct 6.

The conditioning unit 3 includes a battery of heater resistances, an air conditioner for cooling the air (a compressor, a condenser, and an evaporator), a chamber in which new air and recycled air are mixed together, and a motor-driven fan for blowing the air. The conditioning unit receives control signals via electrical connections 7 for controlling the resistances to provide heating, the compressor to provide cooling, the ventilation speed, and the position of flaps for mixing new air and recycled air.

Temperature sensors 8, 9, and 10 deliver signals representative of the temperatures respectively of new air, air blown out, and recycled air. In conventional manner, these signals are applied to a corrector, e.g. of the PID type, that delivers control signals as a function of a set reference temperature.

Figure 2:
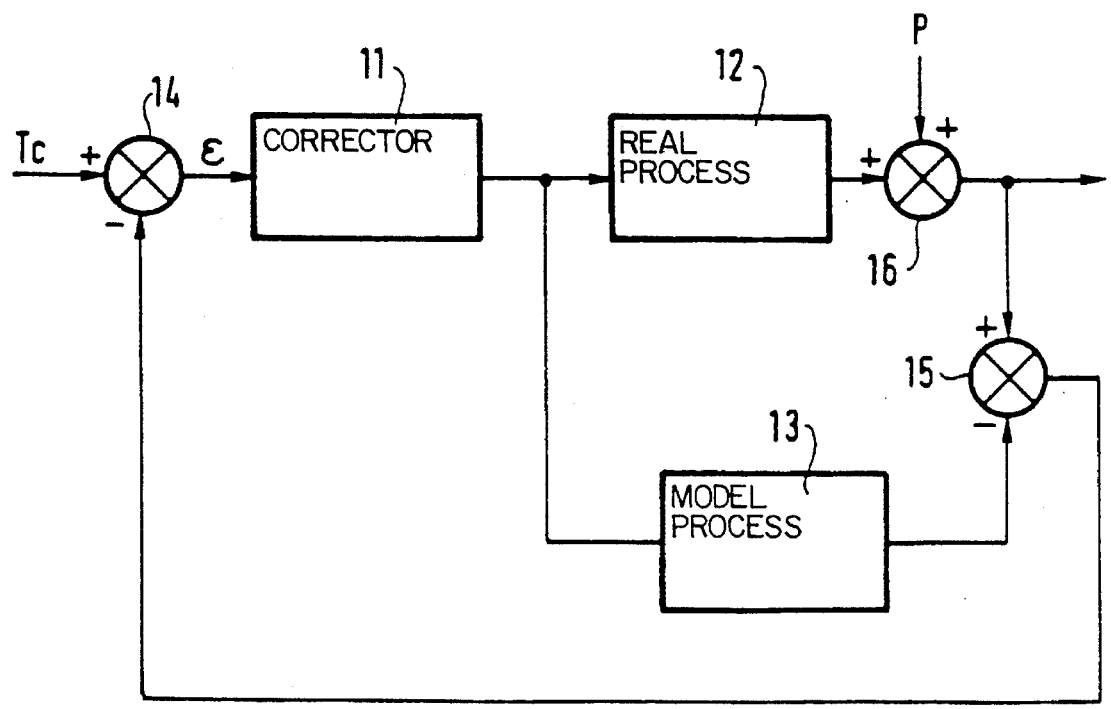
FIG. 2 shows the simplified structure of a railway air conditioning system of the invention.

FIG. 2 is an outline showing the structure of a railway air conditioning system of the invention. Regulation is of the type that is controlled by an internal model. The system comprises a corrector 11 delivering control signals simultaneously to the real process to be controlled 12 and to a model 13 of the process. The reference temperature $T_c$ is applied in the form of an electrical signal to one of the inputs of the comparator 14 whose other input receives a signal from the comparator 15. The comparator 14 delivers an output signal $\epsilon$ to the corrector 11.

The comparator 15 has a first input that receives the output signal from the process 12 (representative of the temperature inside the vehicle), and a second input that receives the output signal from the model 13, and in response it delivers an output signal that is applied to the comparator 14.

The comparator 16 serves as means for symbolically introducing the influence of disturbances P due to the outside environment and also to the passengers in the vehicle.

This type of regulation makes it possible for knowledge about the process that is to be controlled to intervene directly, i.e. it makes use of the model of the system.

Figure 3:
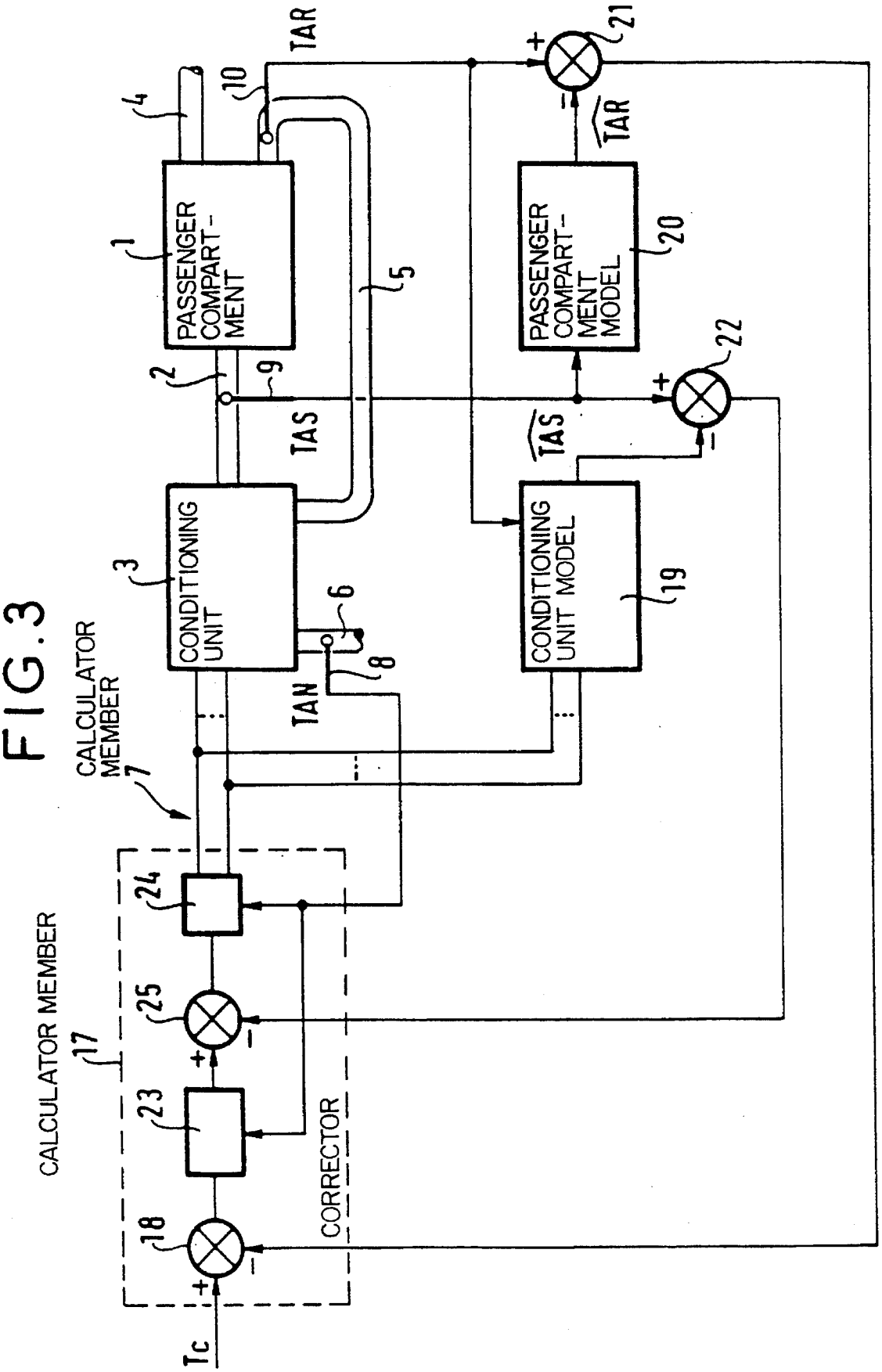
FIG. 3 is a general diagram of the structure of the railway air conditioning system of the invention.

The system of the invention for regulating air conditioning is shown in detail in FIG. 3. Items that are identical to items in FIG. 1 are given the same references. The system further comprises a corrector 17 in which there has been incorporated the comparator 18 that receives the reference temperature $T_c$ on a first input.

The system also includes a model 19 of the conditioning unit that receives the same control signals on its inputs as are received by the conditioning unit 3. The model 19 delivers a signal representative of the estimated temperature of the blown air $\widehat{TAS}$. In response to the magnitude representative of the temperature of the blown air, the model of the passenger compartment 20 delivers a signal representative of the air temperature $\widehat{TAR}$. This signal is applied to one of the inputs of the comparator 21 whose second input receives a signal representative of the temperature of the recycled air TAR. The signal representative of the temperature $\widehat{TAR}$ is also applied to the model 19 in order to implement the "recycled air" function of the real process.

The comparator 21 delivers an output signal which is applied to a second input of the comparator 18 which provides an error signal to the remainder of the corrector 17. The corrector also receives a signal from the temperature sensor 8.

A variant of the system consists in providing a cascade structure using a comparator 22 that receives the signal $\widehat{TAS}$ on one of its inputs and, on another input, a signal representative of the temperature TAS of the air blown into the passenger compartment as delivered by the temperature sensor 9. The comparator 22 delivers an error signal which is applied to the corrector 17. Under such circumstances, the corrector 17 includes two calculator members 23 and 24 separated by a comparator 25. Calculator member 23 receives the error signal delivered by the comparator 18 and a signal representative of the temperature TAN of new air as delivered by the sensor 8. It delivers a signal to a first input of the comparator 25 whose second input receives the error signal provided by the comparator 22. The comparator delivers a signal to calculator member 24 which has another input receiving the signal from the sensor 8. Calculator member 24 responds by delivering the control signals 7.

The corrector may be of a type known to the person skilled in the art. It may be a "fixed" corrector, or a corrector that varies over time (with its parameters changing as a function of the parameters of the models), or it may be a corrector using a predictive control algorithm.

Figure 4:
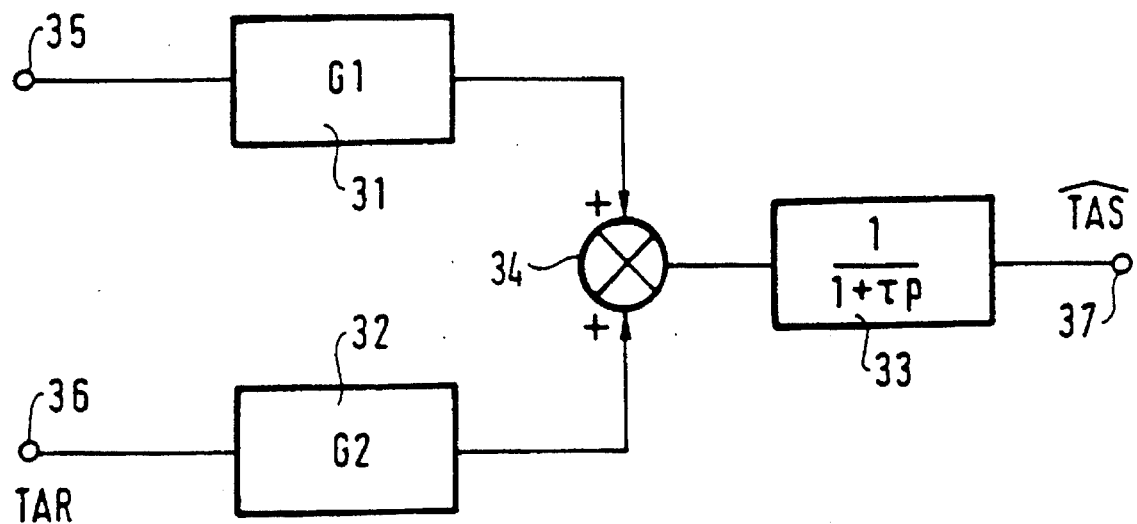
FIGS. 4 and 5 are block diagrams showing details of the structure shown in FIG. 3.

FIG. 4 shows one possible configuration for the conditioning unit model, e.g. for the portion that controls heating, the other portions being identical. This portion of the model comprises three transfer function elements 31, 32, and 33. Element 31 has an input 35 on which it receives a signal corresponding to heating being switched on. It has a transfer function G1. Its output is connected to one of the inputs of a summing circuit 34. Element 32 having transfer function G2 receives the signal TAR (see FIG. 3) on its input 36. Its output is connected to the second input of the summing circuit 34 whose output is connected to the input of element 33. Element 33 has the transfer function $1/(1+\tau p)$ where p is the time differential operator. On its output 37 it delivers the signal $\widehat{TAS}$ corresponding to the magnitude representative of the temperature of the air blown from the conditioning unit.

Experiment has led to G1 being defined as follows:

$$G1=1/(a+b\Delta+c\Delta^2)$$

where $\Delta=|\widehat{TAS}-\widehat{TAR}|$.

The parameters a, b, and c are experimental values obtained during system identification, as are G2 and $\tau$. The inputs of the conditioning unit (control input, recycled air temperature) are caused to intervene in this model and the influence thereof is modulated by the coefficients G1 and G2 and by the time constant $\tau$ of the system. The non-linearity of the thermal system thus appears via the coefficient G1 that varies over time.

In fact, the system includes a third input constituted by the temperature of new air. This element (not taken into account in the diagram of FIG. 4) acts as a simple temperature offset since, if no control is applied to the system, the temperature of the air blown out must be at least equal to the temperature of the new air. Its action is therefore simple to implement and, a priori, does not present any particular difficulty.

Figure 5:
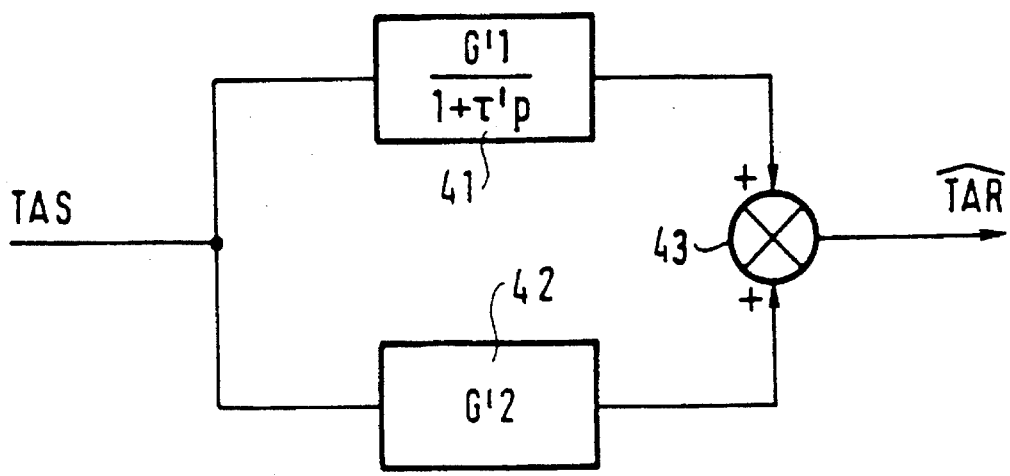

FIG. 5 shows a possible configuration for the model of the passenger compartment. The model comprises two transfer function elements 41 and 42. The inputs of the elements 41 and 42 receive the same signal TAS. Their outputs are connected to the inputs of a summing circuit 43 from which the signal $\widehat{TAR}$ is derived.

The transfer function of the element 41 is $G'1/(1+\tau'p)$ and the transfer function of the element 42 is $G'2=1/(x+y\Delta)$, where $\tau'=1/(z+w\Delta)$ and $\Delta=|\widehat{TAR}-\widehat{TAS}|$, p being the time differential operator.

The parameters x, y, z, w and G'1 are derived from identification of the system. The model of the passenger compartment shows two branches in parallel. The first branch (coefficient G'2) takes account of the direct and rapid action of the blown air on the recycled air. The second branch enables account to be taken of the response time $\tau'$ of the materials constituting the passenger compartment when subjected to blown air.

The non-linear model used by the invention makes it possible to take account of the large difference in dynamic behavior between temperature rises and temperature falls and also of the difference between the starting state (when the air conditioning is switched on) and the final state (obtaining the reference temperature).

An important improvement of the circuit of the invention for regulating air conditioning relates to special management of saturation in the system for controlling regulation.

Such saturation may be caused, for example, by the physical limit on the operating range of the actuators, but it may also be caused by limits on available power.

When control of regulation is saturated, the circuit for regulating air conditioning as described above makes it possible to avoid overshooting the reference, but it suffers from the drawback of being capable of reacting only at the dynamic rate specific to the process, because of the open loop structure of this type of corrector loop.

Figure 6:
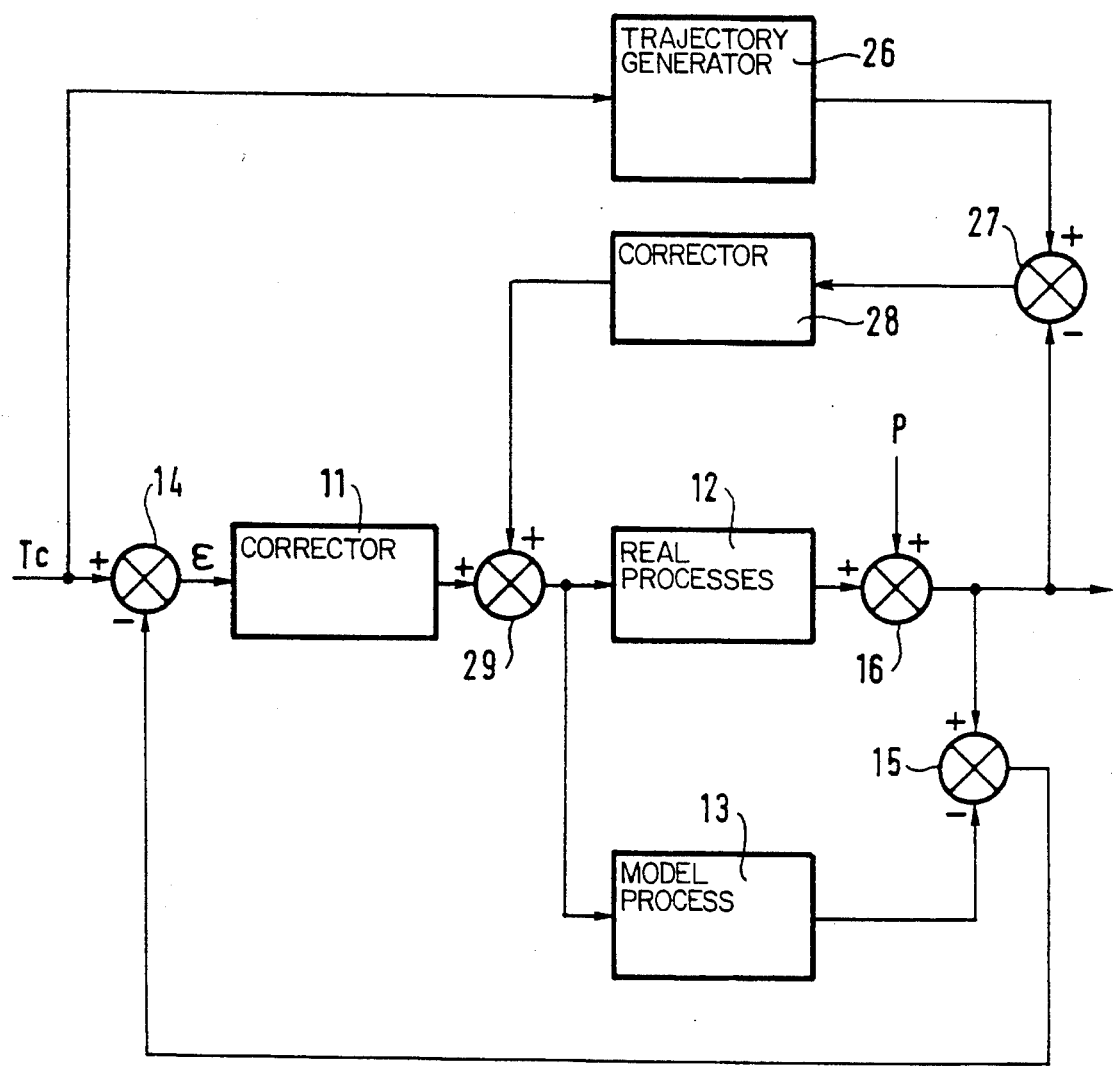
FIG. 6 shows a simplified structure for a railway air conditioning system of the invention in which there is included a branch dedicated to managing saturation.

FIG. 6 shows the simplified structure of a system of the invention for railway air conditioning in which there can be seen a branch which is dedicated to handling saturation.

FIG. 6 reproduces the elements shown in FIG. 2, namely: a corrector 11 delivering control signals simultaneously to the real process to be controlled 12 and to a model 13 of the process. The reference temperature $T_c$ is applied to one of the inputs of the comparator 14 whose second input receives a signal from the comparator 15. The comparator 14 delivers an output signal to the corrector 11.

A first input of the comparator 15 receives the signal output from the process 12 (representing the temperature inside the vehicle), and a second input therefore receives the signal output by the model 13, and it responds by delivering an output signal that is applied to the comparator 14.

The comparator 16 serves symbolically to introduce the influence of disturbances P due to the outside environment and also to the passengers of the vehicle.

In accordance with the improvement of the regulation circuit of the invention, a transfer function element 26, e.g. having a transfer function of the type $G/(1+\tau p)$, receives the reference temperature on its input and serves to deliver a signal representative of the reference trajectory to be followed by the output of the process 12.

The difference between said reference trajectory and the output of the process 12 is calculated by means of a comparator 27 and it serves via a second corrector 28 and a comparator 29 to apply a correction to the conventional control signal delivered by the corrector 11.

In the field of control by means of an internal model, the model of the process must reproduce the process itself as accurately as possible, and in particular the non-linearities thereof. When the model of the process and the process are perfectly identical, then the output signal from the comparator 15 is constantly zero. Operation therefore takes place in open loop mode. If saturation should limit the amplitude of the control signal for the process 12 and for the model 13 of the process, then dynamic targets are no longer satisfied. In addition, the closed loop is incapable of correcting this fault.

In small signal operation, i.e. when performing regulation in the vicinity of an operating point, this anomaly does not appear.

In contrast, when the reference temperature changes significantly, for example when the air conditioning circuit is switched on, then the response of the circuit is much slower than the response corresponding to the reference trajectory.

By comparing the reference trajectory with the real output from the process, the second corrector 28 generates a signal which, when combined with the signal from the conventional corrector 11 by means of the comparator 29, serves to combat the disturbance due to the non-linearity of the actuator.

In addition, in small signal operation, the corrector also serves to combat state or structure disturbances, in the event of there being a mismatch between the system and the model.

We claim:

1. A circuit for regulating the air conditioning of premises, the premises being air conditioned by a conditioning unit, the circuit comprising:

a corrector that receives a reference temperature magnitude signal and a signal representative of the magnitude of the temperature of the premises and outputs control signals in accordance therewith to control operation of the conditioning unit, said corrector comprising:

a transfer function element which receives said reference temperature magnitude signal and outputs a reference trajectory signal representing a desired operation of said conditioning unit;

a comparator which compares said reference trajectory signal and a signal representing said operation of said conditioning unit and outputs a comparison signal; and a correction unit which adjusts said control signals in accordance with said comparison signal; and a simulation member which receives said control signals, adjusted by said correction unit, and performs non-linear and non-stationary simulation of the conditioning unit and the premises.

2. A circuit according to claim 1, wherein the simulation member comprises a component which automatically adapts to stages of temperature rise and temperature fall in the premises.

3. A circuit according to claim 2, wherein the simulation member has a static gain parameter G and a time constant parameter $\tau$, automatic adaptation thereof being obtained by associating said parameters so that they vary inversely proportional to the difference $\Delta$ between the excitation e of the simulation member and its response s so as to satisfy the differential equation:

$$G \cdot e = s + \tau \frac{ds}{dt}$$

in which:

$G=1/(a+b\Delta)$ $\tau=1/(c+d\Delta)$ $\Delta=|s-e|$ where a, b, c and d are coefficients determined during identification of a system including said premises and employing said conditioning unit.

4. A circuit according to claim 1, wherein the simulation member includes a model of the conditioning unit and a model of the premises.

5. A circuit according to claim 4, wherein the conditioning unit sucks in new air which is conditioned and blown into the premises which has an outlet for exhausting air to the outside and an outlet for recycling air via said conditioning unit:

the corrector, which also receives a magnitude representative of the temperature of the new air, delivers control signals in parallel both to the conditioning unit and to the model thereof;

the model of the conditioning unit delivers a signal representing the estimated temperature of the blown air;

the model of the premises delivers a signal representative of the temperature of the recycled air estimated on the basis of a signal representative of the actual temperature of the blown air;

a first comparator receives on one of its two inputs said signal representative of the estimated temperature of the recycled air and on its second input a signal representative of the actual temperature of the air recycled from the premises, said first comparator delivering an output signal constituting the difference between the signals received on its inputs; and the model of the conditioning unit also receives said signal representative of the temperature of the recycled air.

6. A circuit according to claim 5, wherein a second comparator receives on a first input the signal representative of the estimated temperature of the blown air, and on a second input the signal representative of the actual temperature of the air blown into the premises, and delivers to the corrector a signal representative of the difference between its input signals.

7. A circuit according to claim 6, wherein the corrector includes a third comparator receiving on its inputs both the reference temperature magnitude and the magnitude representative of the difference between the temperature of the premises and the estimated temperature thereof, and which delivers an output signal to a first calculation member which delivers an output signal to one of the inputs of a comparator, the comparator receiving on its second input the signal delivered by the second comparator and delivering a signal to a second calculator member which delivers said control signals.

8. A circuit according to claim 1, wherein said premises is a rail vehicle.

9. A circuit according to claim 1, wherein said correction unit comprises a corrector which adjusts said comparison signal and outputs an adjusted comparison signal, and a second comparator which compares said adjusted comparison signals with said control signals to output said adjusted control signals.

10. A circuit for regulating the air conditioning of premises, the premises being air conditioned by a conditioning unit, said circuit comprising:

a corrector that receives a reference temperature magnitude signal and a signal representative of the magnitude of the temperature of the premises and outputs control signals in accordance therewith to control operation of the conditioning unit; and a simulation member which performs non-linear and non-stationary simulation of the conditioning unit and the premises, said simulation member automatically adapting to stages of temperature rise and temperature fall in the premises and having a static gain parameter G and a time constant parameter $\tau$, automatic adaptation of said simulation member being obtained by associating said parameters so that they vary inversely proportional to the difference $\Delta$ between the excitation e of the simulation member and its response s so as to satisfy the differential equation:

$$G \cdot e = s + \tau \frac{ds}{dt}$$

in which:

$G=1/(a+b\Delta)$ $\tau=1/(c+d\Delta)$ $\Delta=|s-e|$ where a, b, c and d are coefficients determined during identification of a system including said premises and employing said conditioning unit.

11. A circuit for regulating the air conditioning of premises, the premises being air conditioned by a conditioning unit, said circuit comprising:

a corrector that receives a reference temperature magnitude signal and a signal representative of the magnitude of the temperature of the premises and outputs control signals in accordance therewith to control operation of the conditioning unit; and a simulation member which performs non-linear and non-stationary simulation of the conditioning unit and the premises, said simulation member includes a model of the conditioning unit and a model of the premises; and wherein:

the conditioning unit sucks in new air which is conditioned and blown into the premises which has an outlet for exhausting air to the outside and an outlet for recycling air via said conditioning unit;

the corrector, which also receives a magnitude representative of the temperature of the new air, delivers control signals in parallel both to the conditioning unit and to the model thereof;

the model of the conditioning unit delivers a signal representing the estimated temperature of the blown air;

the model of the premises delivers a signal representative of the temperature of the recycled air estimated on the basis of a signal representative of the actual temperature of the blown air;

a first comparator receives on one of its two inputs said signal representative of the estimated temperature of the recycled air and on its second input a signal representative of the actual temperature of the air recycled from the premises, said first comparator delivering an output signal constituting the difference between the signals received on its inputs; and the model of the conditioning unit also receives said signal representative of the temperature of the recycled air.

12. A circuit according to claim 11, wherein a second comparator receives on a first input the signal representative of the estimated temperature of the blown air, and on a second input the signal representative of the actual temperature of the air blown into the premises, and delivers to the corrector a signal representative of the difference between its input signals.

13. A circuit according to claim 12, wherein the corrector includes a third comparator receiving on its inputs both the reference temperature magnitude and the magnitude representative of the difference between the temperature of the premises and the estimated temperature thereof, and which delivers an output signal to a first calculation member which delivers an output signal to one of the inputs of a comparator, the comparator receiving on its second input the signal delivered by the second comparator and delivering a signal to a second calculator member which delivers said control signals.

* * * * *